United States Patent
Peters et al.

(10) Patent No.: US 9,296,916 B2
(45) Date of Patent: Mar. 29, 2016

(54) POLY(PHENYLENE ETHER)/EPOXY HOMOGENEOUS SOLID AND POWDER COATING COMPOSITION INCORPORATING SAME

(71) Applicant: SABIC Innovative Plastics IP B.V., Bergen op Zoom (NL)

(72) Inventors: Edward Norman Peters, Lenox, MA (US); Scott Michael Fisher, Delmar, NY (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 13/962,989

(22) Filed: Aug. 9, 2013

(65) Prior Publication Data

US 2015/0045477 A1    Feb. 12, 2015

(51) Int. Cl.

| | |
|---|---|
| C09D 163/00 | (2006.01) |
| C08L 63/00 | (2006.01) |
| C09D 171/00 | (2006.01) |
| C09D 171/12 | (2006.01) |
| C08L 71/00 | (2006.01) |
| C08L 71/12 | (2006.01) |
| C08G 65/38 | (2006.01) |
| C08G 65/40 | (2006.01) |
| C09D 163/04 | (2006.01) |
| C08L 63/04 | (2006.01) |

(52) U.S. Cl.
CPC .............. *C09D 163/00* (2013.01); *C08G 65/38* (2013.01); *C08G 65/40* (2013.01); *C08L 63/00* (2013.01); *C08L 63/04* (2013.01); *C08L 71/00* (2013.01); *C08L 71/12* (2013.01); *C09D 163/04* (2013.01); *C09D 171/00* (2013.01); *C09D 171/12* (2013.01)

(58) Field of Classification Search
USPC ........................................................ 525/396
See application file for complete search history.

(56) References Cited

U.S. PATENT DOCUMENTS

| | | | | |
|---|---|---|---|---|
| 4,568,606 | A | * | 2/1986 | Hart et al. ...................... 428/379 |
| 4,853,423 | A | * | 8/1989 | Walles et al. .................. 523/428 |
| H1667 | H | * | 7/1997 | Poincloux et al. ............. 525/438 |
| 5,834,565 | A | | 11/1998 | Tracy et al. |
| 5,880,221 | A | | 3/1999 | Liska et al. |
| 6,051,662 | A | | 4/2000 | Tracy et al. |
| 6,307,010 | B1 | | 10/2001 | Braat et al. |
| 6,784,260 | B2 | | 8/2004 | Yeager et al. |
| 7,378,455 | B2 | | 5/2008 | Lu et al. |
| 7,429,800 | B2 | | 9/2008 | Lu et al. |
| 7,655,278 | B2 | | 2/2010 | Braidwood et al. |
| 7,671,167 | B2 | | 3/2010 | Carrillo et al. |

| | | | |
|---|---|---|---|
| 2002/0161117 | A1 | 10/2002 | Yin et al. |
| 2007/0004871 | A1 | 1/2007 | Lu et al. |
| 2007/0287261 | A1 | 12/2007 | Davis et al. |
| 2008/0071035 | A1 | 3/2008 | Delsman et al. |
| 2008/0071036 | A1 | 3/2008 | Delsman et al. |

FOREIGN PATENT DOCUMENTS

| | | |
|---|---|---|
| EP | 0537005 A1 | 4/1993 |
| EP | 1167484 A2 | 1/2002 |
| WO | 2007005346 A1 | 1/2007 |

OTHER PUBLICATIONS

Chan et al., "Facile Quantitative Analysis of Hydroxyl End Groups of Poly(2,6-dimethyl-1,4-phenylene oxide)s by 31P NMR Spectroscopy", Macromolecules, 1994, vol. 27, pp. 6371-6375.
Ishii et al., "Processing of Poly(2,6-dimethyl-1,4-phenylene ether) with Epoxy Resin. 1. Reaction-Induced Phase Separation", Macromolecules, 2000, 33, pp. 158-166.
Cytec, "Product Guide—Powder Coating Resins: Binder Resins, Hardeners and Additives", 2011, 28 pages.
PPO SA90-100, SABIC Data Sheet, 2010, 1 page.
Prolongo et al., "Poly(phenylene ether)/epoxy thermoset blends based on anionic polymerization of epoxy monomer", Journal of Applied Polymer Science, vol. 93, pp. 2678-2687 (2004).
Vandeweerdt et al., "Temperature-Concentration Behavior of Solutions of Polydisperse, Atactic Poly(methyl methacrylate) and Its Influence on the Formation of Amorphous, Microporous Membranes", Macromolecules 24, pp. 3547-3552, 1991.
Venderbosch et al., "Processing of intractable polymers using reactive solvents: 1. Poly(2,6-dimethyl-1,4-phenylene ether)/epoxy resin", Polymer, vol. 35, No. 20, 1994, pp. 4349-4357.
International Search Report mailed Nov. 18, 2014; International Application No. PCT/US2014/049849; International Filing Date Aug. 6, 2014; 5 pages.
Written Opinion mailed Nov. 18, 2014; International Applicaiton No. PCT/US2014/049849; International Filing Date Aug. 6, 2014; 7 pages.
Yeager et al., "The Use of Low Molecular Poly(Phenylene Ether) Resin in Epoxy Thermosets", 44th International SAMPE Symposium, May 23-27, 1999, pp. 1075-1089.
International Preliminary Report on Patentability dated Nov. 11, 2015; International Application No. PCT/US2014/049849; International Filing Date Aug. 6, 2014 (6 pages).

* cited by examiner

*Primary Examiner* — Mark Kaucher
*Assistant Examiner* — Kregg Brooks
(74) *Attorney, Agent, or Firm* — Cantor Colburn LLP

(57) ABSTRACT

A homogeneous solid composition includes an aromatic epoxy resin and a poly(phenylene ether) having a number average molecular weight of 600 to 2000 atomic mass units and an average of 1.5 to 3 hydroxyl groups per molecule. The molecular weight and hydroxyl functionality of the poly(phenylene ether) allow it to be dissolved in the epoxy resin at relatively low temperature, and remain dissolved as the solution is cooled and solidified. The homogeneous solid composition facilitates incorporation of the poly(phenylene ether) into powder coating compositions that exhibit reduced water absorption in the cured state.

10 Claims, No Drawings

POLY(PHENYLENE ETHER)/EPOXY HOMOGENEOUS SOLID AND POWDER COATING COMPOSITION INCORPORATING SAME

BACKGROUND OF THE INVENTION

Solid resins are needed as components of powder coating resin formulations. In addition to being solid at ambient temperature, the solid resins need to soften at about 90 to 120° C. for blending with the other components of the powder coating resin formulation. However, the softening temperature of the solid resins cannot be too high because the formulated resin can start to cure at temperatures above 120° C. (or lower depending on the hardener and catalyst in the formulation).

The use of poly(phenylene ether) resin has been shown to enhance the properties of cured epoxy resins. See, for example, evidence of reduced brittleness in U.S. Patent Application Publication No. US 2008/0071035 A1 of Delsman et al. However, even low molecular weight poly(phenylene ether) resins have glass transition temperatures significantly greater than 120° C. It is therefore difficult to finely disperse a poly(phenylene ether) with other components of an epoxy-containing powder coating resin formulation. For example, in S. G. Prolongo, J. C. Cabanelas, T. Fine, J. P. Pascault, "Poly(phenylene ether)/epoxy thermoset blends based on anionic polymerization of epoxy monomer", *Journal of Applied Polymer Science*, volume 93, pages 2678-2687 (2004), cooling apparently homogeneous liquid blends of poly(phenylene ether) and epoxy was accompanied by the observation of cloud points (indicating phase separation) at temperatures of 55° C. and higher. As another example, in U.S. Patent Application No. US 2003/0236361 A1 of Yeager et al., cured powder coatings containing thermoset resin and poly(phenylene ether) exhibit a two-phase morphology in which the poly(phenylene ether) is either in a disperse phase or a co-continuous phase. Improved fracture toughness is associated with the co-continuous morphology.

Inadequate dispersion of a poly(phenylene ether) in a powder coating resin formulation can manifest itself as poor surface quality in the cured powder coating. Also as a result of inadequate dispersion in the powder coating resin formulation, the poly(phenylene ether) may not react with the epoxy and the potential performance advantages of its addition may not be realized.

There is therefore a need for poly(phenylene ether) compositions that facilitate incorporation of poly(phenylene ether) into powder coating resin formulations. There is also a need for powder coating resin formulations containing highly dispersed poly(phenylene ether), as well as powder coating resin formulations that exhibit reduced water absorption in the cured state.

BRIEF SUMMARY OF EMBODIMENTS OF THE INVENTION

One embodiment is a solid composition comprising an aromatic epoxy resin; and a poly(phenylene ether) having a number average molecular weight of 600 to 2000 atomic mass units and an average of 1.5 to 3 hydroxyl groups per molecule; wherein the solid composition comprises the aromatic epoxy resin and the poly(phenylene ether) in amounts effective to produce a single glass transition temperature in the range 40 to 92° C.; and wherein the solid composition exhibits no other glass transition temperature in the range −20 to 200° C.

Another embodiment is a powder coating composition comprising: 20 to 60 parts by weight per 100 parts by weight resin of a solid composition comprising an aromatic epoxy resin, and a poly(phenylene ether) having a number average molecular weight of 600 to 2000 atomic mass units and an average of 1.5 to 3 hydroxyl groups per molecule; and 40 to 80 parts by weight per 100 parts by weight resin of a thermoset resin comprising an aliphatic epoxy resin, a cycloaliphatic epoxy resin, a second aromatic epoxy resin, a cyanate ester resin, a carboxylated polyester resin, or a combination thereof; and a curing agent in an amount effective to cure the powder coating composition; wherein the solid composition comprises the aromatic epoxy resin and the poly(phenylene ether) in amounts effective to produce a single glass transition temperature in the range 40 to 92° C.; and wherein the solid composition exhibits no other glass transition temperature in the range −20 to 200° C.

Another embodiment is an article comprising a cured coating obtained by curing the powder coating composition.

These and other embodiments are described in detail below.

DETAILED DESCRIPTION OF THE INVENTION

The present inventors have determined that a homogeneous solid can be prepared from an aromatic epoxy resin and a poly(phenylene ether) having a particular molecular weight and hydroxyl functionality. The homogeneity of the solid is evidenced by a single glass transition temperature that is below the glass transition temperature of the poly(phenylene ether). As demonstrated in the working examples below, for a given combination of aromatic epoxy resin and poly(phenylene ether), it is possible to determine with minimal experimentation the relative amounts of each resin needed to generate a glass transition temperature of 40 to 95° C. With such a glass transition temperature, the homogeneous solid is a solid at room temperature, but softened or liquefied at the 95 to 120° C. temperatures used to blend the components of a powder coating resin formulation.

Thus, one embodiment is a solid composition comprising an aromatic epoxy resin; and a poly(phenylene ether) having a number average molecular weight of 600 to 2000 atomic mass units and an average of 1.5 to 3 hydroxyl groups per molecule; wherein the solid composition comprises the aromatic epoxy resin and the poly(phenylene ether) in amounts effective to produce a single glass transition temperature in the range 40 to 92° C.; and wherein the solid composition exhibits no other glass transition temperature in the range −20 to 200° C.

In the context of the term "solid composition", the word "solid" means that the composition is solid at ambient temperature (i.e., 23° C.) and one atmosphere. This is further evident in the solid composition's glass transition temperature of 40 to 92° C. and the absence of any other glass transition temperature in the range −20 to 200° C. Within the range of 40 to 92° C., the glass transition temperature of the solid composition can be 45 to 90° C., specifically 50 to 80° C. Glass transition temperature can be determined by differential scanning calorimetry (DSC) using a heating rate of 20° C./minute and a temperature range of −90 to 200° C.

The solid composition comprises an aromatic epoxy resin. Suitable aromatic epoxy resins include, for example, bisphenol A epoxy resins, bisphenol-F epoxy resins, phenol novolac epoxy resins, cresol-novolac epoxy resins, biphenyl epoxy resins, naphthalene epoxy resins, divinylbenzene dioxides, 2-glycidylphenylglycidyl ether, dicyclopentadiene-substituted aromatic epoxy resins, and combinations thereof. In some embodiments, the aromatic epoxy resin comprises a bisphenol A epoxy resin.

In addition to the aromatic epoxy resin, the solid composition comprises a poly(phenylene ether) having a number average molecular weight of 600 to 2000 atomic mass units and an average of 1.5 to 3 hydroxyl groups per molecule. Number average molecular weight can be determined by gel permeation chromatography using polystyrene standards. The average number of hydroxyl groups per molecule can be determined by functionalization with a phosphorus reagent and analysis by $^{31}$P NMR as described in P. Chan, D. S. Argyropoulos, D. M. White, G. W. Yeager, and A. S. Hay, *Macromolecules*, 1994, volume 27, pages 6371-6375. Within the range of 600 to 2000, the number average molecular weight can be 800 to 1800 atomic mass units, specifically 1000 to 1500 atomic mass units. Within the range of 1.5 to 3, the average hydroxyl groups per molecule can be 1.6 to 2.5, specifically 1.7 to 2.1.

The poly(phenylene ether) can be prepared by a redistribution reaction of a poly(phenylene ether) having an average of about one hydroxyl group per molecule with a phenolic compound as described, for example, in U.S. Pat. No. 5,880,221 to Liska et al., and U.S. Pat. No. 6,307,010 B1 to Braat et al.

Alternatively, the poly(phenylene ether) can be prepared by the copolymerization of a monohydric phenol and a dihydric phenol or polyhydric phenol as described, for example, in U.S. Pat. No. 7,671,167 to Carrillo et al. In some embodiments, the poly(phenylene ether) is a copolymer of monomers comprising a monohydric phenol and a dihydric phenol. In some embodiments, the monohydric phenol has the structure

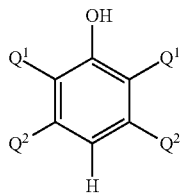

wherein each occurrence of $Q^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Q^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it can, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Q^1$ can be a di-n-butylaminomethyl group formed by reaction of a terminal 3,5-dimethyl-1,4-phenyl group with the di-n-butylamine component of an oxidative polymerization catalyst. In one some, the monohydric phenol is selected from 2,6-dimethylphenol, 2,3,6-trimethylphenol, and combinations thereof. In some embodiments, the monohydric phenol comprises 2,6-dimethylphenol.

In some embodiments, the dihydric phenol has the structure

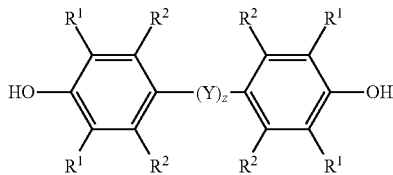

wherein each occurrence of $R^1$ and $R^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; Z is 0 or 1; and Y is selected from

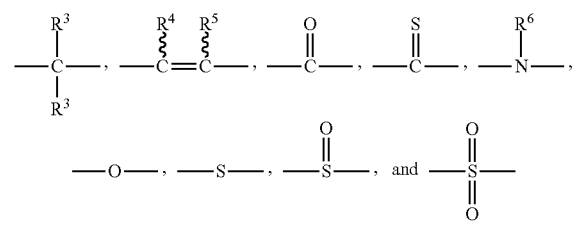

wherein each occurrence of $R^3$-$R^6$ is independently hydrogen or $C_1$-$C_{12}$ hydrocarbyl. In some embodiments, the dihydric phenol is selected from 1,1-bis(3,5-dimethyl-4-hydroxyphenyl)ethane, 1,1-bis(3-chloro-4-hydroxyphenyl)ethane, 1,1-bis(3-methyl-4-hydroxyphenyl)ethane, 1,2-bis(4-hydroxy-3,5-dimethylphenyl)-1,2-diphenylethane, 1,2-bis(3-methyl-4-hydroxyphenyl)-1,2-diphenylethane, 1,2-bis(3-methyl-4-hydroxyphenyl)ethane, 2,2'-binaphthol, 2,2'-biphenol, 2,2'-dihydroxy-4,4'-dimethoxybenzophenone, 2,2'-dihydroxy-4-methoxybenzophenone, 2,2'-dihydroxybenzophenone, 2,2-bis(3,5-dichloro-4-hydroxyphenyl)propane, 2,2-bis(3-bromo-4-hydroxyphenyl)propane, 2,2-bis(3-phenyl-4-hydroxyphenyl)propane, 2,2-bis(3-methyl-4-hydroxyphenyl)propane, 2,2-bis(3,5-dimethyl-4-hydroxyphenyl)propane, 1,1-bis(3,5-dimethyl-4-hydroxyphenyl)-1-phenylethane, 1,1-bis(3-chloro-4-hydroxyphenyl)-1-phenylethane, 1,1-bis(3-methyl-4-hydroxyphenyl)-1-phenylethane, 2,2-bis(4-hydroxy-3,5-dimethyl phenyl)-1-phenylpropane, 2,2-bis(4-hydroxy-3,5-dimethyl phenyl)hexane, 2,2-bis(4-hydroxy-3,5-dimethylphenyl)pentane, 2,2-bis(3-methyl-4-hydroxynaphthyl)propane, 2,2-bis(3-methyl-4-hydroxyphenyl)-1-phenylpropane, 2,2-bis(3-methyl-4-hydroxyphenyl)hexane, 2,2-bis(3-methyl-4-hydroxyphenyl) pentane, 2,2'-methylenebis(4-methylphenol), 2,2'-methylenebis[4-methyl-6-(1-methylcyclohexyl)phenol], 3,3',5,5'-tetramethyl-4,4'-biphenol, 3,3'-dimethyl-4,4'-biphenol, bis(2-hydroxyphenyl)methane, bis(4-hydroxy-2,6-dimethyl-3-methoxyphenyl)methane, bis(3,5-dimethyl-4-hydroxyphenyl)methane, bis(3-methyl-4-hydroxyphenyl) methane, bis(4-hydroxy-3,5-dimethyl phenyl) cyclohexylmethane, bis(4-hydroxy-3,5-dimethyl phenyl) phenylmethane, bis(3-methyl-4-hydroxyphenyl) cyclohexylmethane, bis(3-methyl-4-hydroxyphenyl) methane, bis(3,5-dimethyl-4-hydroxyphenyl)methane, bis (3-methyl-4-hydroxyphenyl)phenylmethane, 2,2',3,3',5,5'-hexamethyl-4,4'-biphenol, octafluoro-4,4'-biphenol, 2,3,3',5, 5'-pentamethyl-4,4'-biphenol, 1,1-bis(3,5-dibromo-4- hydroxyphenyl)cyclohexane 1,1-bis(3,5-dimethyl-4-hydroxyphenyl)cyclohexane, bis(3-methyl-4-hydroxyphenyl)cyclohexane, tetrabromobiphenol, tetrabromobisphenol A, tetrabromobisphenol S, 2,2'-diallyl-4,4'-bisphenol A, 2,2'-diallyl-4,4'-bisphenol S, 3,3',5,5'-tetramethyl-4,4'-bisphenol sulfide, 3,3'-dimethyl bisphenol sulfide, 3,3',5,5'-tetramethyl-4,4'-bisphenolsulfone, and combinations thereof. In some embodiments, the dihydric phenol comprises 2,2-bis(3,5-dimethyl-4-hydroxyphenyl)propane.

In some embodiments, the monohydric phenol comprises 2,6-dimethylphenol and the dihydric phenol comprises 2,2-bis(3,5-dimethyl-4-hydroxyphenyl)propane.

In some embodiments, the poly(phenylene ether) comprises a hydroxy-diterminated poly(phenylene ether) having the structure

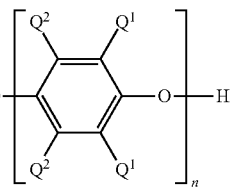

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; m and n are independently 0 to 15, provided that the sum of m and n is, on average, 3 to 15; and Y is selected from a direct bond,

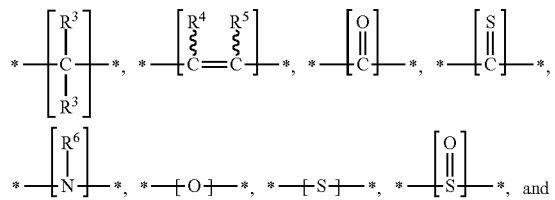

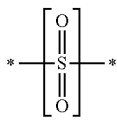

wherein each occurrence of $R^3$-$R^6$ is independently hydrogen or $C_1$-$C_{12}$ hydrocarbyl.

In some embodiments, the poly(phenylene ether) comprises a hydroxy-diterminated poly(phenylene ether) having the structure

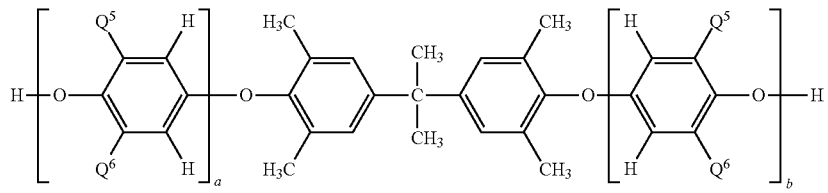

wherein each occurrence of $Q^5$ and $Q^6$ is independently methyl or di-n-butylaminomethyl, and each occurrence of a and b is independently 0 to 15, provided that the sum of a and b is, on average, 3 to 15.

The solid composition comprises the aromatic epoxy resin and the poly(phenylene ether) in amounts effective to produce a single glass transition temperature in the range 40 to 92° C. Effective amounts are readily determined without undue experimentation using the procedure described for Examples 1-46 and Comparative Examples 1-40, below. The effective amounts depend on factors include the chemical structure of the aromatic epoxy resin, the chemical structure of the poly(phenylene ether), the number average molecular weight of the poly(phenylene ether), and the average number of hydroxyl groups per molecule of the poly(phenylene ether). Depending on such factors, the amount of the aromatic epoxy resin can range, at least, from 20 to 95 weight percent, based on the weight of the solid composition, and the amount of the poly(phenylene ether) can range, at least, from 5 to 80 weight percent, based on the weight of the solid composition.

The solid composition can, optionally, further comprise one or more additives known in the epoxy thermoset art. Such additives include, for example, colorants (including dyes and pigments), mineral fillers, antioxidants, heat stabilizers, light stabilizers, lubricants, flow modifiers, drip retardants, flame retardants, antistatic agents, substrate adhesion agents, low-profile additives, stress-relief additives, anti-crater and leveling additives, micronized waxes, processing additives for improving pigment and filler dispersion and incorporation, degassing agents, and combinations thereof.

In some embodiments, the solid composition excludes solvents. In this context it will be understood that "solvents" does not include liquid aromatic epoxy resins. In these embodiments, excludes solvents include, for example, $C_3$-$C_8$ ketones, $C_4$-$C_8$N,N-dialkylamides, $C_6$-$C_{12}$ aromatic hydrocarbons, $C_4$-$C_{16}$ dialkyl ethers, $C_3$-$C_6$ alkyl alkanoates, and $C_2$-$C_6$ alkyl cyanides. The exclusion of solvents is desirable because they are unnecessary to dissolve the poly(phenylene ether) and because their presence reduces the glass transition temperature of the solid composition.

In some embodiments, the solid composition excludes curing agents for the aromatic epoxy resin. In this context, it will be understood that the term "curing agents" excludes the poly(phenylene ether), even though its hydroxyl groups are capable of reaction with the aromatic epoxy resin. Exclusion of curing agents improves the storage stability of the solid composition.

In some embodiments, the solid composition consists of the aromatic epoxy resin and the poly(phenylene ether).

In a very specific embodiment of the solid composition, the aromatic epoxy resin comprises a bisphenol A epoxy resin; the poly(phenylene ether) comprises a hydroxy-diterminated poly(phenylene ether) having the structure

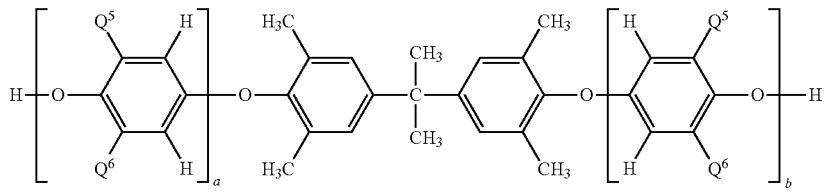

wherein each occurrence of $Q^5$ and $Q^6$ is independently methyl or di-n-butylaminomethyl, and each occurrence of a and b is independently 0 to 15, provided that the sum of a and b is, on average, 3 to 15; and the single glass transition temperature is in the range 45 to 90° C.

The solid composition is useful for incorporating poly(phenylene ether) into a powder coating composition. Thus, one embodiment is a powder coating composition comprising: 20 to 60 parts by weight per 100 parts by weight resin of a solid composition comprising an aromatic epoxy resin; and a poly(phenylene ether) having a number average molecular weight of 600 to 2000 atomic mass units and an average of 1.5 to 3 hydroxyl groups per molecule; wherein the solid composition comprises the aromatic epoxy resin and the poly(phenylene ether) in amounts effective to produce a single glass transition temperature in the range 40 to 92° C.; and wherein the solid composition exhibits no other glass transition temperature in the range −20 to 200° C.; 40 to 80 parts by weight per 100 parts by weight resin of a thermoset resin comprising an aliphatic epoxy resin, a cycloaliphatic epoxy resin, a second aromatic epoxy resin, a cyanate ester resin, or a combination thereof; and a curing agent in an amount effective to cure the powder coating composition.

In some embodiments, the aromatic epoxy resin of the solid composition comprises a bisphenol A epoxy resin, a bisphenol-F epoxy resin, a phenol novolac epoxy resin, a cresol-novolac epoxy resin, a biphenyl epoxy resin, a naphthalene epoxy resin, a divinylbenzene dioxide, 2-glycidylphenylglycidyl ether, a dicyclopentadiene-substituted aromatic epoxy resin, or a combination thereof. In some embodiments, the aromatic epoxy resin comprises a bisphenol A epoxy resin.

In some embodiments, the poly(phenylene ether) comprises a hydroxy-diterminated poly(phenylene ether) having the structure

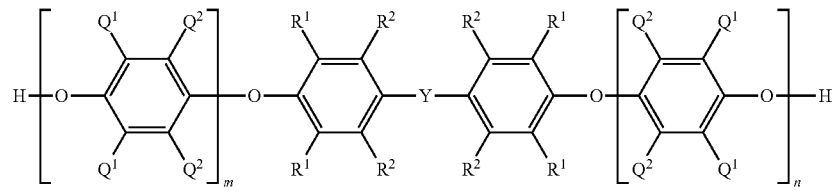

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; m and n are independently 0 to 15, provided that the sum of m and n is, on average, 3 to 15; and Y is selected from a direct bond,

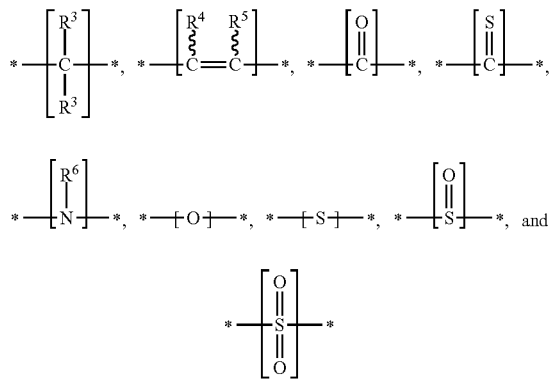

wherein each occurrence of $R^3$-$R^6$ is independently hydrogen or $C_1$-$C_{12}$ hydrocarbyl.

In some embodiments, the poly(phenylene ether) comprises a hydroxy-diterminated poly(phenylene ether) having the structure

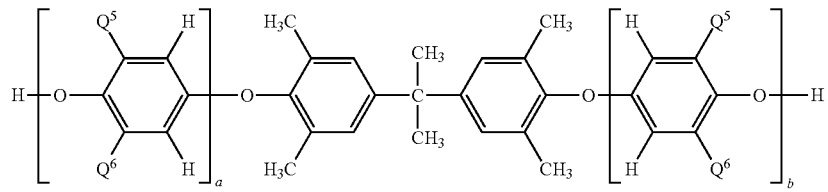

wherein each occurrence of $Q^5$ and $Q^6$ is independently methyl or di-n-butylaminomethyl, and each occurrence of a and b is independently 0 to 15, provided that the sum of a and b is, on average, 3 to 15.

The solid composition is used in an amount of 20 to 60 parts by weight per 100 parts by weight resin (phr). Within this range, the solid composition amount can be 25 to 55 parts by weight, specifically 30 to 50 parts by weight.

In addition to the solid composition, the powder coating composition contains a thermoset resin. The thermoset resin comprises an aliphatic epoxy resin, a cycloaliphatic epoxy resin, a second aromatic epoxy resin, a cyanate ester resin, a carboxylated polyester resin, or a combination thereof. When the thermoset resin is the second aromatic epoxy resin, it can be the same as or different from the aromatic epoxy resin component of the solid composition. In some embodiments, the thermoset resin comprises an aliphatic epoxy resin, a cycloaliphatic epoxy resin, a bisphenol A epoxy resin, a bisphenol-F epoxy resin, a phenol novolac epoxy resin, a cresol-novolac epoxy resin, a biphenyl epoxy resin, a naphthalene epoxy resin, a divinylbenzene dioxide, 2-glycidylphenylglycidyl ether, a dicyclopentadiene-linked aromatic epoxy resin, a carboxylated polyester resin, or a combination thereof. In some embodiments, the thermoset resin comprises a carboxylated polyester resin. The thermoset resin is used in an amount of 40 to 80 parts by weight per 100 parts by weight resin (phr). Within this range, the thermoset resin amount can be 45 to 75 parts by weight, specifically 50 to 70 parts by weight.

In addition to the solid composition and the thermoset resin, the powder coating composition comprises a curing agent. Suitable curing agents include hardeners, such as dicyandiamide, phenolic curing agents, and catalysts, such a 2-methylimidazole. Powder coating curing agents are commercially available as, for example, the imidazole adducts available as EPIKURE™ Curing Agent P-101, P-103, P-104, and P-108 from Momentive; the linear phenolic curing agent available as EPIKURE Curing Agent P-201 and P-202 from Momentive; the dicyandiamide hardener available as DYHARD™ 100M from Alzchem; 2-Methylimidazole, available from Long Chemical; a phenolic type curing agent containing an imidazole catalyst, available as EPOKUKDO™ KD-404 from Kukdo Chemical; and the modified aliphatic amine curing agents available as ANCAMINE™ 2441 and 2442, available from Air Products. The curing agent is used in an amount effective to cure the powder coating composition. The specific amount of curing agent used will depend on the identity of the curing agent, among other factors, and can be readily determined by the skilled person.

The powder coating composition can, optionally, further comprise one or more additives known in the powder coating art. Such additives include, for example, colorants (including dyes and pigments), mineral fillers, antioxidants, heat stabilizers, light stabilizers, lubricants, flow modifiers, drip retardants, flame retardants, antistatic agents, substrate adhesion agents, low-profile additives, stress-relief additives, anti-crater and leveling additives, micronized waxes, processing additives for improving pigment and filler dispersion and incorporation, degassing agents, and combinations thereof. Other than mineral fillers, such additives, when present, are generally used in a total amount less than or equal to 5 weight percent, based on the total weight of the composition. Mineral fillers, when present can be used in an amount of 5 to 90 weight percent, based on the total weight of the composition. Within this range, the mineral filler amount can be 10 to 80 weight percent, specifically 20 to 70 weight percent, more specifically 30 to 60 weight percent. Suitable mineral fillers include, for example, silica, alumina, aluminum silicate, calcium silicate, zirconium silicate, boron nitride, boron silicate, titanium dioxide, wollastonite, barium sulfate, calcium sulfate, calcium carbonate, talc, mica, clay, hollow and solid glass spheres, kaolin, silicon carbide, molybdenum sulfide, zinc sulfide, barium titanate, barium ferrite, carbon fibers, glass fibers, and combinations thereof.

In a very specific embodiments, the aromatic epoxy resin of the solid composition comprises a bisphenol A epoxy resin; the poly(phenylene ether) comprises a hydroxy-diterminated poly(phenylene ether) having the structure

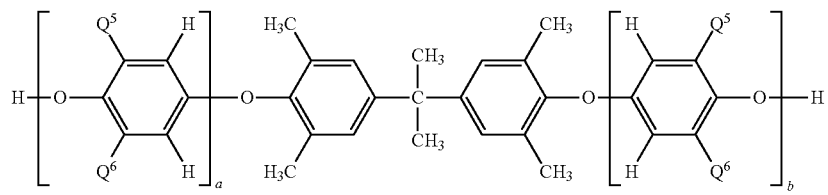

wherein each occurrence of $Q^5$ and $Q^6$ is independently methyl or di-n-butylaminomethyl, and each occurrence of a and b is independently 0 to 15, provided that the sum of a and b is, on average, 3 to 15; and the single glass transition temperature is in the range 45 to 90° C. In some embodiments of the above powder coating composition, the thermoset resin comprises a bisphenol A epoxy resin. In some embodiments of the above powder coating composition, the thermoset resin comprises a carboxylated polyester resin. In some embodiments of the above powder coating composition, the thermoset resin comprises a combination of a carboxylated polyester resin and a bisphenol A epoxy resin.

One embodiment is an article comprising a cured coating obtained by curing the powder coating composition of any of the above-described powder coating compositions. Articles comprising cured powder coating compositions include, for example, automotive exterior components, appliances, bicycle frames, furniture, and information technology and telecommunications components. The powder coating composition can be applied to an article using known equipment such, for example, an electrostatic gun (also known as a corona gun), a tribo gun, or an aerated powder-filled bed. Once applied to an article, the coating is cured. Curing can be conducted with known equipment such as a convection cure oven, an infrared cure oven, or laser curing. Curing is typically conducted at a temperature of 190 to 210° C. for 5 to 20 minutes.

Glass transition temperature data for cured compositions show that they exhibit a single glass transition temperature, indicating that the poly(phenylene ether) does not exist as a disperse or co-continuous phase separate from a phase comprising the cured aromatic epoxy resin and the cured thermoset resin.

The invention includes at least the following embodiments.

Embodiment 1: A solid composition comprising: an aromatic epoxy resin; and a poly(phenylene ether) having a number average molecular weight of 600 to 2000 atomic mass units and an average of 1.5 to 3 hydroxyl groups per molecule; wherein the solid composition comprises the aromatic epoxy resin and the poly(phenylene ether) in amounts effective to produce a single glass transition temperature in the range 40 to 92° C.; and wherein the solid composition exhibits no other glass transition temperature in the range −20 to 200° C.

Embodiment 2: The solid composition of embodiment 1, wherein the aromatic epoxy resin comprises a bisphenol A epoxy resin, a bisphenol-F epoxy resin, a phenol novolac epoxy resin, a cresol-novolac epoxy resin, a biphenyl epoxy resin, a naphthalene epoxy resin, a divinylbenzene dioxide, 2-glycidylphenylglycidyl ether, a dicyclopentadiene-substituted aromatic epoxy resin, or a combination thereof.

Embodiment 3: The solid composition of embodiment 1, wherein the aromatic epoxy resin comprises a bisphenol A epoxy resin.

Embodiment 4: The solid composition of embodiment 1, wherein the poly(phenylene ether) comprises a hydroxy-diterminated poly(phenylene ether) having the structure

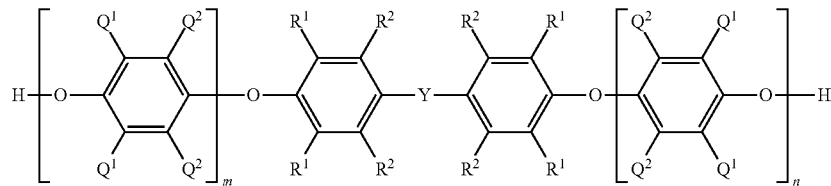

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; m and n are independently 0 to 15, provided that the sum of m and n is, on average, 3 to 15; and Y is selected from a direct bond,

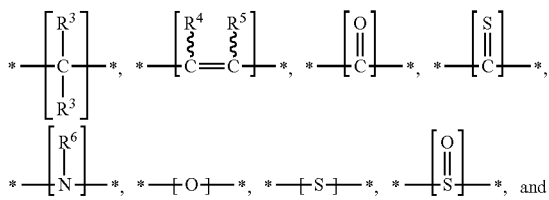

-continued

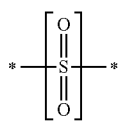

wherein each occurrence of $R^3$-$R^6$ is independently hydrogen or $C_1$-$C_{12}$ hydrocarbyl.

Embodiment 5: The solid composition of any of embodiments 1-3, wherein the poly(phenylene ether) comprises a hydroxy-diterminated poly(phenylene ether) having the structure

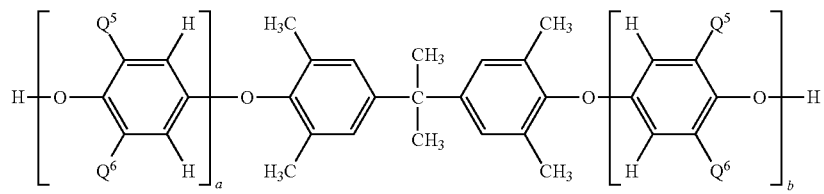

wherein each occurrence of $Q^5$ and $Q^6$ is independently methyl or di-n-butylaminomethyl, and each occurrence of a and b is independently 0 to 15, provided that the sum of a and b is, on average, 3 to 15.

Embodiment 6: The solid composition of any of embodiments 1-5, excluding solvents.

Embodiment 7: The solid composition of any of embodiments 1-6, excluding curing agents for the aromatic epoxy resin.

Embodiment 8: The solid composition of any of embodiments 1-5, consisting of the aromatic epoxy resin and the poly(phenylene ether).

Embodiment 9: The solid composition of embodiment 1, wherein the aromatic epoxy resin comprises a bisphenol A epoxy resin; wherein the poly(phenylene ether) comprises a hydroxy-diterminated poly(phenylene ether) having the structure

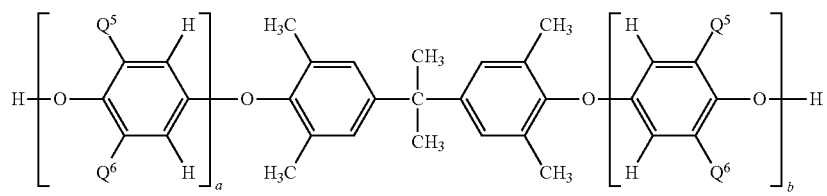

wherein each occurrence of $Q^5$ and $Q^6$ is independently methyl or di-n-butylaminomethyl, and each occurrence of a and b is independently 0 to 15, provided that the sum of a and b is, on average, 3 to 15; and wherein the single glass transition temperature is in the range 45 to 90° C.

Embodiment 10: A powder coating composition comprising: 20 to 60 parts by weight per 100 parts by weight resin of a solid composition comprising an aromatic epoxy resin, and a poly(phenylene ether) having a number average molecular weight of 600 to 2000 atomic mass units and an average of 1.5 to 3 hydroxyl groups per molecule; 40 to 80 parts by weight per 100 parts by weight resin of a thermoset resin comprising an aliphatic epoxy resin, a cycloaliphatic epoxy resin, a second aromatic epoxy resin, a cyanate ester resin, a carboxylated polyester resin, or a combination thereof; and a curing agent in an amount effective to cure the powder coating composition; wherein the solid composition comprises the aromatic epoxy resin and the poly(phenylene ether) in amounts effective to produce a single glass transition temperature in the range 40 to 92° C.; and wherein the solid composition exhibits no other glass transition temperature in the range −20 to 200° C.

Embodiment 11: The powder coating composition of embodiment 10, wherein the aromatic epoxy resin comprises a bisphenol A epoxy resin, a bisphenol-F epoxy resin, a phenol novolac epoxy resin, a cresol-novolac epoxy resin, a biphenyl epoxy resin, a naphthalene epoxy resin, a divinylbenzene dioxide, 2-glycidylphenylglycidyl ether, a dicyclopentadiene-substituted aromatic epoxy resin, or a combination thereof.

Embodiment 12: The powder coating composition of embodiment 10, wherein the aromatic epoxy resin comprises a bisphenol A epoxy resin.

Embodiment 13: The powder coating composition of any of embodiments 10-12, wherein the poly(phenylene ether) comprises a hydroxy-diterminated poly(phenylene ether) having the structure

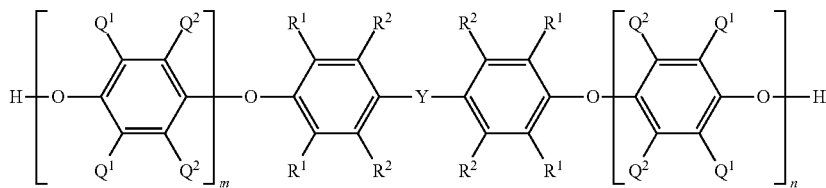

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; m and n are independently 0 to 15, provided that the sum of m and n is, on average, 3 to 15; and Y is selected from a direct bond,

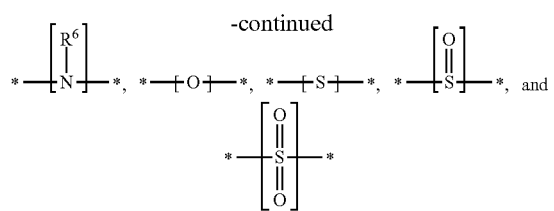

-continued wherein each occurrence of $R^3$-$R^6$ is independently hydrogen or $C_1$-$C_{12}$ hydrocarbyl.

Embodiment 14: The powder coating composition of any of embodiments 10-12, wherein the poly(phenylene ether) comprises a hydroxy-diterminated poly(phenylene ether) having the structure

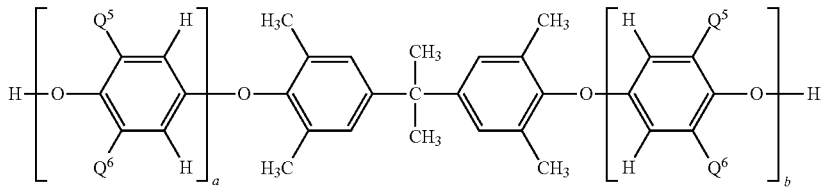

wherein each occurrence of $Q^5$ and $Q^6$ is independently methyl or di-n-butylaminomethyl, and each occurrence of a and b is independently 0 to 15, provided that the sum of a and b is, on average, 3 to 15.

Embodiment 15: The powder coating composition of any of embodiments 10-14, wherein the thermoset resin comprises an aliphatic epoxy resin, a cycloaliphatic epoxy resin, a bisphenol A epoxy resin, a bisphenol-F epoxy resin, a phenol novolac epoxy resin, a cresol-novolac epoxy resin, a biphenyl epoxy resin, a naphthalene epoxy resin, a divinylbenzene dioxide, 2-glycidylphenylglycidyl ether, a dicyclopentadiene-linked aromatic epoxy resin, or a combination thereof.

Embodiment 16: The powder coating composition of any of embodiments 10-15, wherein the thermoset resin comprises a carboxylated polyester resin.

Embodiment 17: The powder coating composition of embodiment 10, wherein the aromatic epoxy resin comprises a bisphenol A epoxy resin; wherein the poly(phenylene ether) comprises a hydroxy-diterminated poly(phenylene ether) having the structure

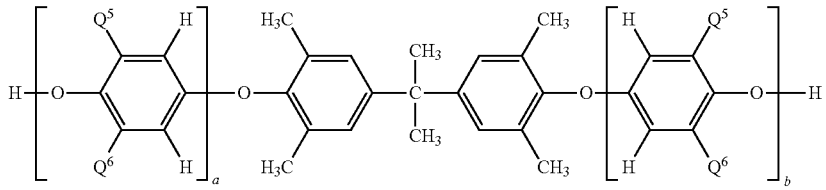

wherein each occurrence of $Q^5$ and $Q^6$ is independently methyl or di-n-butylaminomethyl, and each occurrence of a and b is independently 0 to 15, provided that the sum of a and b is, on average, 3 to 15; and wherein the single glass transition temperature is in the range 45 to 90° C.

Embodiment 18: An article comprising a cured coating obtained by curing the powder coating composition of any of embodiments 10-17.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

EXAMPLES 1-46, COMPARATIVE EXAMPLES 1-40

These examples illustrate the preparation of solid solutions consisting of hydroxy-diterminated poly(phenylene ether) and epoxy resin. Materials used in these examples are summarized in Table 1.

TABLE 1

| Name | Description |
|---|---|
| PPE-2OH | Copolymer of 2,6-dimethylphenol and 2,2-bis(3,5-dimethyl-4-hydroxyphenyl)propane, CAS Reg. No. 1012321-47-9, having a number average molecular weight of 1680 atomic mass units, an average of 1.9 hydroxyl groups per molecule, and a glass transition temperature of about 145° C.; obtained as NORYL ™ SA90 Resin from SABIC Innovative Plastics. |
| Epoxy 1 | 2,2-Bis(4-hydroxyphenyl)propane-epichlorohydrin polymer, a high viscosity liquid epoxy resin having an epoxide equivalent weight of 175 grams per equivalent; obtained as D.E.R. ™ 332 Liquid Epoxy Resin from Dow Chemical. |
| Epoxy 2 | 2,2-Bis(4-hydroxyphenyl)propane-epichlorohydrin polymer, a solid epoxy resin having an epoxide equivalent weight of 185 grams per equivalent obtained as EPON ™ Resin 828 from Momentive Specialty Chemicals. |
| Epoxy 3 | 2,2-Bis(4-hydroxyphenyl)propane-epichlorohydrin polymer, a high viscosity liquid epoxy resin having an epoxide equivalent weight of 199 grams per equivalent; obtained as D.E.R. ™ 317 Liquid Epoxy Resin from Dow Chemical. |
| Epoxy 4 | 2,2-Bis(4-hydroxyphenyl)propane-epichlorohydrin polymer, a solid epoxy resin having an epoxide equivalent weight of 528 grams per equivalent obtained as EPON ™ Resin 1001F from Momentive Specialty Chemicals. |
| Epoxy 5 | 2,2-Bis(4-hydroxyphenyl)propane-epichlorohydrin polymer, a high molecular weight Type 8 solid epoxy resin having an epoxide equivalent weight of 702 grams per equivalent; obtained as D.E.R. ™ 6224 Solid Epoxy resin from Dow Chemical. |
| Epoxy 6 | 2,2-Bis(4-hydroxyphenyl)propane-epichlorohydrin polymer, a high molecular weight Type 5 solid epoxy resin having an epoxide equivalent weight of 1365 grams per equivalent obtained as D.E.R. ™ 6155 Solid Epoxy Resin from Dow Chemical. |
| Epoxy 7 | Polyglycidyl ether of ortho-cresol novolac, a solid epoxy resin having an epoxide equivalent weight of 217 grams per equivalent; obtained as EPON ™ Resin 164 from Momentive Specialty Chemicals. |

Homogeneous solutions were prepared by adding PPE-2OH into epoxy with heat and stirring at a temperature that did not exceed 130° C. After the PPE-2OH was completely dissolved, the material was cooled to ambient temperature to yield a solid material. Glass transition temperatures were determined by differential scanning calorimetry (DSC) using a heating rate of 20° C./minute and a temperature range of −90 to 200° C. Results are summarized in Tables 2-10 for various concentrations of PPE-2OH in one or a combination of epoxy resins. In Tables 2-10, component amounts are in weight percent (wt %) based on the total weight of the composition. For each composition, the glass transition temperature reported was the only glass transition observed in the temperature range −20 to 200° C.

These examples show that homogeneous solids with glass transition temperatures of 40 to 92° C. can be prepared with the poly(phenylene ether) and various aromatic epoxy resins. Homogeneity and solidity under ambient conditions are indicated by the single glass transition temperature which is at or above 40° C.

TABLE 2

| | Epoxy 1 (wt %) | PPE-2OH (wt %) | $T_g$ (° C.) |
|---|---|---|---|
| C. Ex. 1 | 100 | 0 | −14.5 |
| C. Ex. 2 | 95 | 5 | −12.9 |
| C. Ex. 3 | 90 | 10 | −12.0 |
| C. Ex. 4 | 80 | 20 | −8.2 |
| C. Ex. 5 | 70 | 30 | −1.4 |
| C. Ex. 6 | 60 | 40 | 8.0 |
| C. Ex. 7 | 50 | 50 | 26.7 |
| Ex. 1 | 40 | 60 | 45.0 |
| Ex. 2 | 30 | 70 | 67.6 |

TABLE 2-continued

| | Epoxy 1 (wt %) | PPE-2OH (wt %) | $T_g$ (° C.) |
|---|---|---|---|
| Ex. 3 | 25 | 75 | 79.7 |
| Ex. 4 | 20 | 80 | 92.0 |
| C. Ex. 8 | 10 | 90 | 128.6 |

TABLE 3

| | Epoxy 2 (wt %) | PPE-2OH (wt %) | Tg (° C.) |
|---|---|---|---|
| C. Ex. 9 | 100 | 0 | −16.0 |
| C. Ex. 10 | 95 | 5 | −12.8 |
| C. Ex. 11 | 90 | 10 | −10.0 |
| C. Ex. 12 | 80 | 20 | −8.0 |
| C. Ex. 13 | 70 | 30 | 0.1 |
| C. Ex. 14 | 60 | 40 | 11.1 |
| C. Ex. 15 | 50 | 50 | 28.0 |
| Ex. 5 | 40 | 60 | 49.5 |
| Ex. 6 | 30 | 70 | 72.0 |
| Ex. 7 | 25 | 75 | 80.2 |
| Ex. 8 | 20 | 80 | 91.5 |
| C. Ex. 16 | 10 | 90 | 114.2 |

TABLE 4

|  | Epoxy 3 (wt %) | PPE-2OH (wt %) | Tg (° C.) |
|---|---|---|---|
| C. Ex. 17 | 100 | 0 | −14.2 |
| C. Ex. 18 | 95 | 5 | −12.0 |
| C. Ex. 19 | 90 | 10 | −9.0 |
| C. Ex. 20 | 80 | 20 | −2.4 |
| C. Ex. 21 | 70 | 30 | 5.4 |
| C. Ex. 22 | 60 | 40 | 14.0 |
| C. Ex. 23 | 50 | 50 | 25.4 |
| Ex. 9 | 40 | 60 | 40.5 |
| Ex. 10 | 30 | 70 | 66.4 |
| Ex. 11 | 25 | 75 | 80.6 |
| C. Ex. 24 | 20 | 80 | 96.2 |
| C. Ex. 25 | 10 | 90 | 115.1 |

TABLE 5

|  | Epoxy 4 (wt %) | PPE-2OH (wt %) | Tg (° C.) |
|---|---|---|---|
| C. Ex. 26 | 100 | 0 | 40.0 |
| Ex. 12 | 95 | 5 | 42.0 |
| Ex. 13 | 90 | 10 | 43.0 |
| Ex. 14 | 80 | 20 | 47.0 |
| Ex. 15 | 70 | 30 | 52.0 |
| Ex. 16 | 60 | 40 | 56.9 |
| Ex. 17 | 50 | 50 | 63.5 |
| Ex. 18 | 40 | 60 | 76.5 |
| C. Ex. 27 | 30 | 70 | 95.4 |
| C. Ex. 28 | 80 | 80 | 117.7 |
| C. Ex. 29 | 10 | 90 | 135.0 |

TABLE 6

|  | Epoxy 5 (wt %) | PPE-2OH (wt %) | Tg (° C.) |
|---|---|---|---|
| C. Ex. 30 | 100 | 0 | 48.0 |
| Ex. 19 | 95 | 5 | 49.6 |
| Ex. 20 | 90 | 10 | 51.3 |
| Ex. 21 | 80 | 20 | 55.0 |
| Ex. 22 | 70 | 30 | 59.1 |
| Ex. 23 | 60 | 40 | 63.4 |
| Ex. 24 | 50 | 50 | 69.4 |
| Ex. 25 | 40 | 60 | 83.2 |
| C. Ex. 31 | 30 | 70 | 103.5 |
| C. Ex. 32 | 80 | 80 | 125.1 |
| C. Ex. 33 | 10 | 90 | 138.9 |

TABLE 7

|  | Epoxy 6 (wt %) | PPE-2OH (wt %) | Tg (° C.) |
|---|---|---|---|
| C. Ex. 34 | 100 | 0 | 69.9 |
| Ex. 26 | 95 | 5 | 71.6 |
| Ex. 27 | 90 | 10 | 73.7 |
| Ex. 28 | 80 | 20 | 77.6 |
| Ex. 29 | 70 | 30 | 81.1 |
| Ex. 30 | 60 | 40 | 85.0 |
| Ex. 31 | 50 | 50 | 89.7 |
| C. Ex. 35 | 40 | 60 | 99.2 |
| C. Ex. 36 | 30 | 70 | 113.9 |
| C. Ex. 37 | 80 | 80 | 131.5 |
| C. Ex. 38 | 10 | 90 | 143.6 |

TABLE 8

|  | Epoxy 5 (wt %) | Epoxy 6 (wt %) | Epoxy 3 (wt %) | PPE-2OH (wt %) | Tg (° C.) |
|---|---|---|---|---|---|
| Ex. 21 | 80 | 0 | 0 | 20 | 55.0 |
| Ex. 32 | 75 | 5 | 0 | 20 | 60.5 |
| Ex. 33 | 70 | 10 | 0 | 20 | 61.8 |
| Ex. 22 | 70 | 0 | 0 | 30 | 59.1 |
| Ex. 34 | 65 | 0 | 5 | 30 | 55.7 |
| Ex. 35 | 60 | 0 | 10 | 30 | 51.8 |
| Ex. 23 | 60 | 0 | 0 | 40 | 63.4 |
| Ex. 36 | 55 | 0 | 5 | 40 | 56.2 |
| Ex. 37 | 50 | 0 | 10 | 40 | 52.6 |

TABLE 9

|  | Epoxy 7 (wt %) | PPE-2OH (wt %) | Tg (° C.) |
|---|---|---|---|
| C. Ex. 39 | 100 | 0 | 45.2 |
| Ex. 38 | 95 | 5 | 48.2 |
| Ex. 39 | 90 | 10 | 50.7 |
| Ex. 40 | 80 | 20 | 54.2 |
| Ex. 41 | 70 | 30 | 57.8 |
| Ex. 42 | 60 | 40 | 64.5 |
| Ex. 43 | 50 | 50 | 73.1 |
| Ex. 44 | 40 | 60 | 83.3 |
| C. Ex. 40 | 30 | 70 | 94.2 |

TABLE 10

|  | Epoxy 7 (wt %) | Epoxy 3 (wt %) | PPE-2OH (wt %) | Tg (° C.) |
|---|---|---|---|---|
| Ex. 42 | 60 | 0 | 40 | 64.5 |
| Ex. 45 | 55 | 5 | 40 | 58.6 |
| Ex. 46 | 50 | 10 | 40 | 55.5 |

EXAMPLES 47-49, COMPARATIVE EXAMPLES 41-42

These examples illustrate the preparation of powder coating resins using the epoxy/poly(phenylene ether) homogeneous solids. Materials used in these examples are summarized in Table 11.

TABLE 11

| Name | Description |
|---|---|
| Epoxy 5 | 2,2-Bis(4-hydroxyphenyl)propane-epichlorohydrin copolymer, a high molecular weight Type 8 solid epoxy resin having an epoxide equivalent weight of 702 grams per equivalent; obtained as D.E.R. ™ 6224 Solid Epoxy resin from Dow Chemical. |

TABLE 11-continued

| Name | Description |
|---|---|
| Epoxy 7 | Polyglycidyl ether of ortho-cresol novolac, a solid epoxy resin having an epoxide equivalent weight of 217 grams per equivalent; obtained as EPON ™ Resin 164 from Momentive Specialty Chemicals. |
| Epoxy 8 | 2,2-Bis(4-hydroxyphenyl)propane-epichlorohydrin copolymer, a low molecular weight solid epoxy resin having an epoxide equivalent weight of 840 grams per equivalent, containing 10 weight percent of a polyacrylate flow modifier; obtained as D.E.R. ™ 6330-A10 Solid Epoxy Resin from Dow Chemical. |
| Hardener | Dicyandiamide, CAS Reg. No. 461-58-5, obtained as DYHARD ™ 100M from Alzchem. |
| 2-MI | 2-Methylimidazole, CAS Reg. No. 693-98-1; obtained from Long Chemical. |
| KD-404 | A phenolic type curing agent which contains an imidazole catalyst; obtained as EPOKUKDO ™ KD-404 from Kukdo Chemical. |
| Degassing agent | Benzoin, CAS Reg. No. 119-53-9, obtained from Estron Chemical. |
| Example 21 | Homogeneous solid containing 20 weight percent PPE-2OH, 80 weight percent Epoxy 5 |
| Example 23 | Homogeneous solid containing 40 weight percent PPE-2OH, 60 weight percent Epoxy 5 |
| Example 34 | Homogeneous solid containing 30 weight percent PPE-2OH, 65 weight percent Epoxy 5, 5 weight percent Epoxy 3 |
| Example 36 | Homogeneous solid containing 40 weight percent PPE-2OH, 55 weight percent Epoxy 5, 10 weight percent Epoxy 3 |
| Example 40 | Homogeneous solid containing 20 weight percent PPE-2OH, 80 weight percent Epoxy 7 |
| Example 41 | Homogeneous solid containing 30 weight percent PPE-2OH, 70 weight percent Epoxy 7 |
| Example 42 | Homogeneous solid containing 40 weight percent PPE-2OH, 60 weight percent Epoxy 7 |
| Polyester resin | A carboxylated polyester resin for use in medium-cure 60/40 hybrid powder coatings, having an Acid Value of 48 milligrams potassium hydroxide per gram of resin, and containing an imidazole-type curing catalyst; obtained as CRYLCOAT ™ 1626-0 Resin from Cytec. |
| Flow Agent | 67 weight percent acrylic polymer adsorbed on 33 weight percent amorphous silica; obtained as RESIFLOW ™ P-67 from Estron Chemical. |
| $TiO_2$ | Rutile titanium dioxide, obtained as KRONOS ™ 2160 from Kronos. |
| Blanc Fixe | Barium sulfate, obtained as SACHTOFINE ™ P from Sachtleben. |
| Wollastonite | Wollastonite (filler); obtained as NYAD ™ 1250 from NYCO. |
| PPE-2OH | Copolymer of 2,6-dimethylphenol and 2,2-bis(3,5-dimethyl-4-hydroxyphenyl)propane, CAS Reg. No. 1012321-47-9, having a number average molecular weight of 1680 atomic mass units, an average of 1.9 hydroxyl groups per molecule, and a glass transition temperature of about 145° C.; obtained as NORYL ™ SA90 Resin from SABIC Innovative Plastics. |

Hybrid epoxy-polyester powder coating formulations are summarized in Table 12. Note that Comparative Example 42 contains particulate poly(phenylene ether) that was not pre-dissolved in epoxy.

The materials were mixed and pulverized in the blender for about 30 seconds. The mixed and pulverized material was fed into a twin screw co-rotating extruder. The temperatures were 100-120° C. and the contact time was about 10-20 seconds. The extrudate was fed into chilled rollers to give a ribbon and or flaked material. This material was ground in a Retsch mill and sieved to produce approximately 40 micrometer powder.

This powder was electrostatically sprayed onto cold rolled steel coupons. The coated coupons were placed in an oven and cured at 190-205° C. for 5-20 minutes.

A qualitative assessment of surface texture was made by comparing the surface finish of each formula to the Powder Coating Institute Smoothness Standards (10=very smooth, 1=textured). Water uptake values, expressed in units of weight percent based on the initial weight of the coated coupons, were evaluated after 144 hours immersion in deionized water at 23° C. The coated coupons were pre-conditioned at 80° C. and 580 millimeters of mercury vacuum for 16 hours. Pellet flow was determined according to ASTM D4242-07 (2013) using a 1.0 gram pellet (12.5 millimeter diameter) and 15 minutes at 190.6° C. (375° F.) bake condition. Pellet flow data correlated well with texture observations. Values for 60° specular gloss were determined according to ASTM D523-08.

Property results are presented in Table 12. Note that Comparative Example B which contains Particulate PPE that had not been pre-dissolved in epoxy exhibited very poor surface characteristics. When the PPE-2OH was pre-dissolved in epoxy, the surfaces were smooth. Also note that the moisture absorption decreases with increasing levels of PPE-2OH.

TABLE 12

|  | C. Ex. 41 | Ex. 47 | Ex. 48 | C. Ex. 42 | Ex. 49 |
|---|---|---|---|---|---|
| COMPOSITIONS | | | | | |
| Polyester Resin | 198.61 | 181.57 | 171.10 | 171.10 | 158.89 |
| Epoxy 5 | 118.93 | 0 | 0 | 102.48 | 0 |
| Flow Agent | 5.00 | 5.00 | 5.00 | 5.00 | 5.00 |
| Degassing Agent | 2.50 | 2.50 | 2.50 | 2.50 | 2.50 |
| Example 21 | 0 | 135.93 | 0 | 0 | 0 |
| Example 34 | 0 | 0 | 146.40 | 0 | 0 |
| PPE-OH2 | 0 | 0 | 0 | 43.92 | 0 |
| Example 36 | 0 | 0 | 0 | 0 | 158.61 |
| $TiO_2$ | 150.00 | 150.00 | 150.00 | 150.00 | 150.00 |
| Blanc Fixe | 25.00 | 25.00 | 25.00 | 25.00 | 25.00 |
| wt % PPE in total formula | 0.0 | 5.4 | 8.8 | 8.8 | 12.7 |
| wt % PPE in resin | 0.0 | 8.4 | 13.5 | 13.5 | 19.5 |

TABLE 12-continued

|  | C. Ex. 41 | Ex. 47 | Ex. 48 | C. Ex. 42 | Ex. 49 |
|---|---|---|---|---|---|
| PROPERTIES | | | | | |
| Texture | 6-7 | 6 | 6-7 | 1* | 5 |
| Water Uptake | 0.033 | 0.026 | 0.024 | 0.023 | 0.021 |
| Pellet Flow (mm) | 106 | 80 | 71 | 70 | 57 |
| 60° Gloss | 87.6 | 87.8 | 90.7 | 27.0 | 87.3 |
| $T_g$ (° C.) | 105 | 109 | 111 | 105, 152 | 113 |

*Wrinkled surface

EXAMPLES 50-52, COMPARATIVE EXAMPLES 43 And 44

The formulations used for Examples 50-52 and Comparative Examples 43 and 44 are summarized in Table 13. Note that Comparative Example 44 contains PPE-OH2 that was not pre-dissolved in epoxy. The materials were mixed and pulverized in the blender for about 30 seconds. The mixed and pulverized material was fed into a twin screw co-rotating extruder. The temperatures were 100-120° C. and the contact time was about 10-20 seconds. The extrudate was fed into chilled rollers to give a ribbon and or flaked material. This material was ground in a Retsch mill and sieved to produce approximately a powder with particles of approximately 40 micrometers diameter.

This powder was electrostatically sprayed onto cold rolled steel coupons. The coated coupons were placed in an oven and cured at 190-205° C. for 5-20 minutes. Properties of the resulting coatings are summarized in Table 13. Note that Comparative Example 44, which contains PPE-OH2 that had not been pre-dissolved in epoxy, exhibited very poor surface characteristics. In contrast, surfaces were smooth for coatings prepared with the Examples 50-52 compositions utilizing poly(phenylene ether) pre-dissolved in epoxy. Also note that moisture absorption decreases with increasing levels of poly (phenylene ether) in Examples 50-52.

TABLE 13

|  | C. Ex. 43 | Ex. 50 | Ex. 51 | C. Ex. 44 | Ex. 52 |
|---|---|---|---|---|---|
| COMPOSITIONS | | | | | |
| Epoxy 5 | 282.3 | 0 | 0 | 200.76 | 0 |
| Epoxy 8 | 25.0 | 25.0 | 25.0 | 25.0 | 25.0 |
| Hardener | 15.2 | 12.1 | 10.7 | 10.7 | 9.4 |
| 2-MI | 0.64 | 0.53 | 0.47 | 0.47 | 0.41 |
| Benzoin | 2.5 | 2.5 | 2.5 | 2.5 | 2.5 |
| Example 21 | 0 | 285.4 | 0 | 0 | 0 |
| Example 22 | 0 | 0 | 286.8 | 0 | 0 |
| PPE-OH2 | 0 | 0 | 0 | 86.04 | 0 |
| Example 23 | 0 | 0 | 0 | 0 | 288.1 |
| TiO$_2$ | 150.0 | 150.0 | 150.0 | 150.0 | 150.0 |
| Wollastonite | 25.0 | 25.0 | 25.0 | 25.0 | 25.0 |
| wt % PPE in total formula | 0.0 | 11.4 | 17.2 | 17.2 | 23.0 |
| wt % PPE in resin | 0.0 | 17.5 | 26.4 | 26.4 | 35.4 |
| PROPERTIES | | | | | |
| Texture | 8 | 8 | 7 | 2 | 6 |
| Water Uptake | 0.056 | 0.040 | 0.035 | 0.036 | 0.032 |
| Pellet Flow (mm) | 86 | 69 | 57 | 39 | 44 |
| 60° Gloss | 100 | 93 | 84 | 35 | 60 |

EXAMPLES 53-55 AND COMPARATIVE EXAMPLE 45

The formulations used for Examples 53-55, and Comparative Example 45 are listed in Table 14.

The materials were mixed and pulverized in the blender for about 30 seconds. The mixed and pulverized material was fed into a twin screw co-rotating extruder. The temperatures were 100-120° C. and the contact time was about 10-20 seconds. The extrudate was fed into chilled rollers to give a ribbon and or flaked material. This material was ground in a Retsch mill and sieved to produce approximately a powder with particles of approximately 40 micrometers diameter.

This powder was electrostatically sprayed onto cold rolled steel coupons. The coated coupons were placed in an oven and cured at 190-205° C. for 5-20 minutes. Properties of the resulting coatings are summarized in Table 14. Note that the moisture absorption decreases with increasing levels of poly (phenylene ether).

TABLE 14

|  | C. Ex. 45 | Ex. 53 | Ex. 54 | Ex. 55 |
|---|---|---|---|---|
| COMPOSITIONS | | | | |
| Epoxy 7 | 137.3 | 0 | 0 | 0 |
| Epoxy 8 | 25.0 | 25.0 | 25.0 | 25.0 |
| KD-404 | 160.2 | 144.4 | 134.4 | 123.5 |
| Degassing agent | 2.5 | 2.5 | 2.5 | 2.5 |
| Example 40 | 0 | 153.5 | 0 | 0 |
| Example 41 | 0 | 0 | 163.1 | 0 |
| Example 42 | 0 | 0 | 0 | 174.0 |
| TiO$_2$ | 150.0 | 150.0 | 150.0 | 150.0 |
| Wollastonite | 25.0 | 25.0 | 25.0 | 25.0 |
| wt % PPE in total formula | 0.0 | 6.1 | 9.8 | 13.9 |
| wt % PPE in resin | 0.0 | 9.4 | 15.1 | 21.4 |
| PROPERTIES | | | | |
| Texture | 5 | 4 | 3 | 2 |
| Water Uptake | 0.031 | 0.028 | 0.025 | 0.025 |
| Pellet Flow (mm) | 45 | 30 | 30 | 12 |
| 60° Gloss | 80 | 70 | 60 | 50 |

The invention claimed is:

1. A powder coating composition comprising:
   20 to 60 parts by weight per 100 parts by weight resin of a solid composition comprising an aromatic epoxy resin, and a poly(phenylene ether) having a number average molecular weight of 600 to 2000 atomic mass units and an average of 1.5 to 3 hydroxyl groups per molecule;
   40 to 80 parts by weight per 100 parts by weight resin of a thermoset resin comprising an aliphatic epoxy resin, a cycloaliphatic epoxy resin, a second aromatic epoxy resin, a cyanate ester resin, a carboxylated polyester resin, or a combination thereof, provided that the second aromatic epoxy resin is different from the aromatic epoxy resin of the solid composition; and
   a curing agent in an amount effective to cure the powder coating composition;
   wherein the solid composition comprises the aromatic epoxy resin and the poly(phenylene ether) in amounts effective to produce a single glass transition temperature in the range 40 to 92 ° C.; and
   wherein the solid composition exhibits no other glass transition temperature in the range -20 to 200° C.

2. The powder coating composition of claim 1, wherein the aromatic epoxy resin comprises a bisphenol A epoxy resin, a bisphenol-F epoxy resin, a phenol novolac epoxy resin, a cresol-novolac epoxy resin, a biphenyl epoxy resin, a naphthalene epoxy resin, a divinylbenzene dioxide, 2-glycidylphenylglycidyl ether, a dicyclopentadiene-substituted aromatic epoxy resin, or a combination thereof.

3. The powder coating composition of claim 1, wherein the aromatic epoxy resin comprises a bisphenol A epoxy resin.

4. The powder coating composition of claim 1, wherein the poly(phenylene ether) comprises a hydroxy-diterminated poly(phenylene ether) having the structure

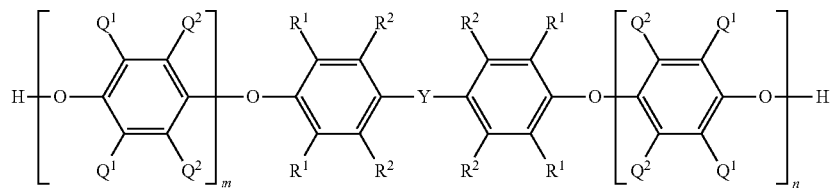

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, hydrocarbyloxy, or $C_2$-$C_{12}$ halohydrocarbyloxy wherein at least two carbon atoms separate the halogen and oxygen atoms; m and n are independently 0 to 15, provided that the sum of m and n is, on average, 3 to 15; and Y is selected from a direct bond,

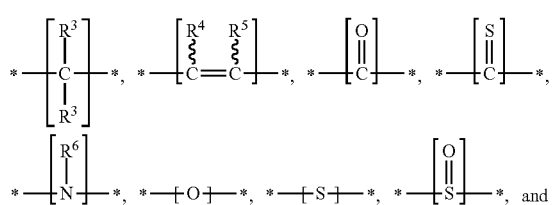

wherein each occurrence of $R^3$-$R^6$ is independently hydrogen or $C_1$-$C_{12}$ hydrocarbyl.

5. The powder coating composition of claim 1, wherein the poly(phenylene ether) comprises a hydroxy-diterminated poly(phenylene ether) having the structure

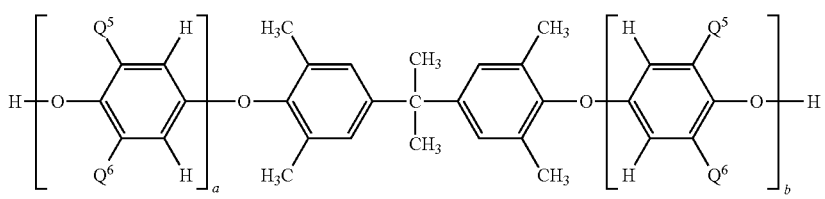

wherein each occurrence of $Q^5$ and $Q^6$ is independently methyl or di-n-butylaminomethyl, and each occurrence of a and b is independently 0 to 15, provided that the sum of a and b is, on average, 3 to 15.

6. The powder coating composition of claim 1, wherein the thermoset resin comprises an aliphatic epoxy resin, a cycloaliphatic epoxy resin, a bisphenol A epoxy resin, a bisphenol-F epoxy resin, a phenol novolac epoxy resin, a cresol-novolac epoxy resin, a biphenyl epoxy resin, a naphthalene epoxy resin, a divinylbenzene dioxide, 2-glycidylphenylglycidyl ether, a dicyclopentadiene-linked aromatic epoxy resin, or a combination thereof.

7. The powder coating composition of claim 1, wherein the thermoset resin comprises a carboxylated polyester resin.

8. The powder coating composition of claim 1,
wherein the aromatic epoxy resin comprises a bisphenol A epoxy resin;

wherein the poly(phenylene ether) comprises a hydroxy-diterminated poly(phenylene ether) having the structure

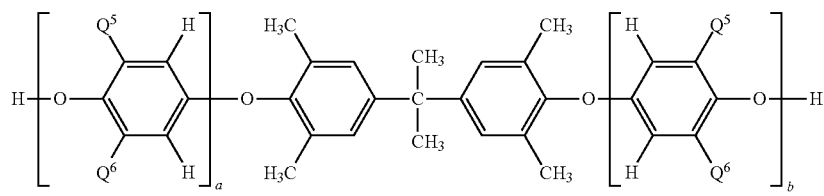

wherein each occurrence of $Q^5$ and $Q^6$ is independently methyl or di-n-butylaminomethyl, and each occurrence of a and b is independently 0 to 15, provided that the sum of a and b is, on average, 3 to 15; and wherein the single glass transition temperature is in the range 45 to 90 ° C.

9. An article comprising a cured coating obtained by curing the powder coating composition of claim 1.

10. The powder coating composition of claim 1, wherein the thermoset resin comprises a cyanate ester resin, a carboxylated polyester resin, or a combination thereof.

* * * * *